May 8, 1956　　　　H. B. CRAIG　　　　2,744,459
OSCILLATING WEEDER AND CULTIVATOR FOR TRACTORS
Filed Dec. 21, 1953　　　　　　　　　　3 Sheets-Sheet 1

HUGH B. CRAIG,
INVENTOR.

BY　*Eaton & Bell*

ATTORNEYS

May 8, 1956     H. B. CRAIG     2,744,459
OSCILLATING WEEDER AND CULTIVATOR FOR TRACTORS
Filed Dec. 21, 1953     3 Sheets-Sheet 2
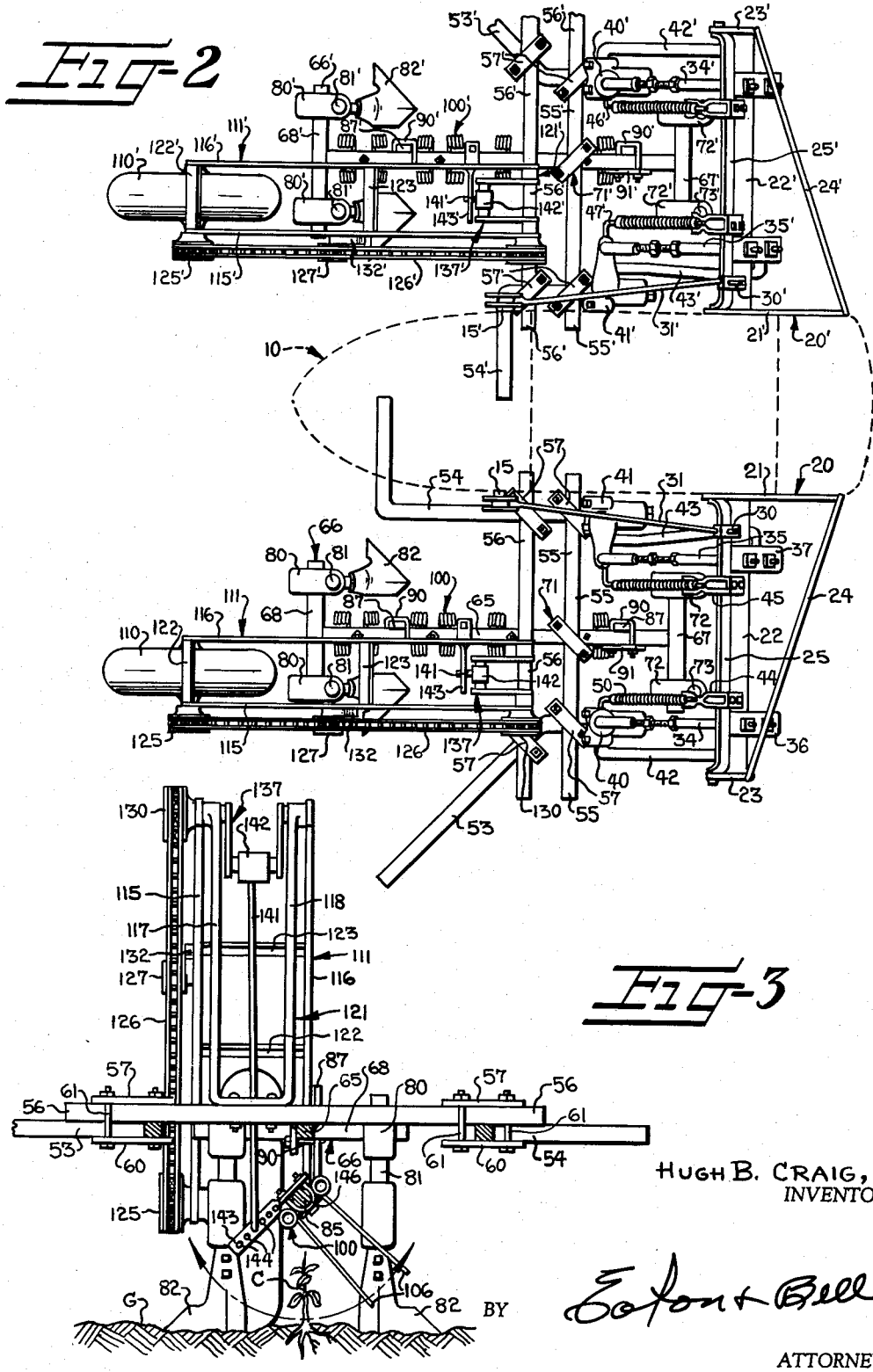
HUGH B. CRAIG,
INVENTOR.
BY Eaton & Bell
ATTORNEYS May 8, 1956   H. B. CRAIG   2,744,459
OSCILLATING WEEDER AND CULTIVATOR FOR TRACTORS
Filed Dec. 21, 1953   3 Sheets-Sheet 3
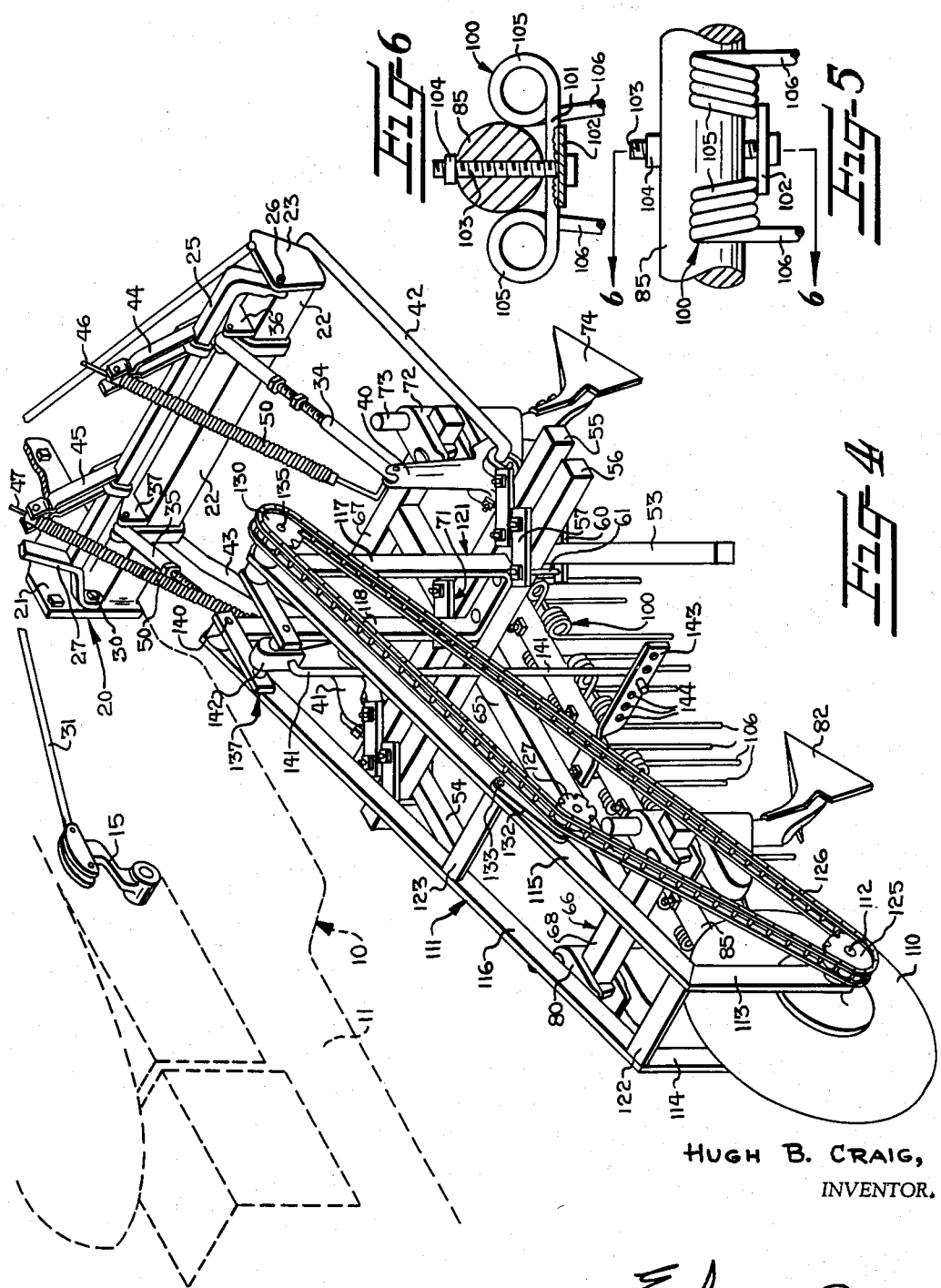
HUGH B. CRAIG,
INVENTOR.
BY  *Eaton & Bell*
ATTORNEYS United States Patent Office 2,744,459
Patented May 8, 1956

2,744,459

OSCILLATING WEEDER AND CULTIVATOR FOR TRACTORS

Hugh B. Craig, Concord, N. C.

Application December 21, 1953, Serial No. 399,411

4 Claims. (Cl. 97—35)

This invention relates to agricultural implements and, more especially, to an improved apparatus adapted to be mounted on a tractor for cultivating and weeding or hoeing relatively small plants, particularly cotton plants in the early stages of their growth.

This application is a continuation-in-part of my co-pending application entitled Hoeing Attachment for Tractors, Serial Number 308,311, filed September 8, 1952, now abandoned.

As is well known, it is very difficult to cultivate and properly weed small cotton plants and the like which are planted in rows, since these plants are very tender and are planted closely together. When the plants are small it is currently necessary to hoe the earth around the same manually to break up the earth to permit penetration of water and to form a mulch and to eliminate grass, weeds and the like which, if not removed by hoeing or the like, soon choke out the small cotton plants. Of course, as the plants become larger and stronger, conventional plows or the like can readily be utilized to pile earth around the base of the plants to eliminate the hoeing procedure.

Various attempts have been made heretofore to provide means for effectively cultivating and weeding relatively small plants, such as cotton plants, in the early stages of their growth, but these have not been successful primarily due to the fact that the cotton plants are so tender that attempts to use machinery have heretofore resulted in excessive damage to the small cotton plants and, in instances where the damage to the plants has not been excessive, the devices used were extremely complicated and expensive to manufacture and maintain and the weeding devices which have been used for this purpose have operated in such a manner as to throw the earth to one side of the general line of the row of plants during the weeding operation with the result that insufficient earth would be left between adjacent plants to induce continued efficient growth of the plants.

For example, when the earth is moved away from between adjacent plants, this is particularly hazardous during relatively dry weather because the roots of the plants would be so close to the surface of the earth that they would soon dry out and the plants would wilt or die.

It is therefore the primary object of this invention to provide a simple, durable and relatively inexpensive apparatus embodying means for overcoming the aforesaid difficulties in the cultivation and weeding of plants of cotton or the like which apparatus includes two parallel rows of spaced spring fingers or resilient tines adapted to traverse a row of plants between spaced pairs of cultivator plows or plowing blades, each of which pair of plowing blades straddles the row of plants, and wherein the tines are driven by a wheel contacting the ground over which the apparatus is moved to cause the tines to oscillate in an arcuate path across the row of plants thereby shifting the earth between adjacent plants in the row back and forth so that a substantial part of the earth remains between adjacent plants, although the earth is disturbed sufficiently to unearth weeds and the like between adjacent plants.

The tines are driven to oscillate at a speed conforming to the rate of movement of the implement over the ground and, since the cotton plants are usually evenly spaced, the movement of the tines is such that they will generally miss the cotton plants while efficiently cultivating, hoeing or weeding the area adjacent the plants to thereby allow penetration of water adjacent the plants and to form a mulch from the unearthed weeds and the like which will retain moisture around the roots of the plants.

It is another object of this invention to provide a self-contained unit comprising a universal mounting bar which is part of an I-frame and can readily be attached to the usual types of implement raising and lowering devices on many different types of tractors. The I-frame carries a rocker shaft from which two rows of inherently resilient tines depend and the rocker shaft is driven, to oscillate at a speed corresponding to the rate of movement of the I-frame over the ground, by means of a ground wheel disposed rearwardly of and to one side of the rows of tines, suitable driving connections being provided between the ground wheel and the rocker shaft for imparting oscillation to the rocker shaft.

Some of the objects of the invention having been stated, other objects will appear as the description proceeds, when taken in connection with the accompanying drawings, in which—

Figure 2 is a top plan view of the front portion of the tractor shown in Figure 1, showing the same in broken lines and wherein the improved attachment is mounted on each side of the tractor;

Figure 3 is an enlarged vertical sectional view, mostly in elevation, taken substantially along line 3—3 in Figure 1, but showing the improved attachment removed from the tractor;

Figure 4 is an isometric view of the improved attachment on one side of the tractor and wherein a portion of the tractor is shown in broken lines;

Figure 5 is an enlarged fragmentary elevation showing how the tines, spring fingers or rake members are secured to the oscillating shaft;

Figure 6 is a fragmentary vertical sectional view taken along line 6—6 in Figure 5.

Figure 1:
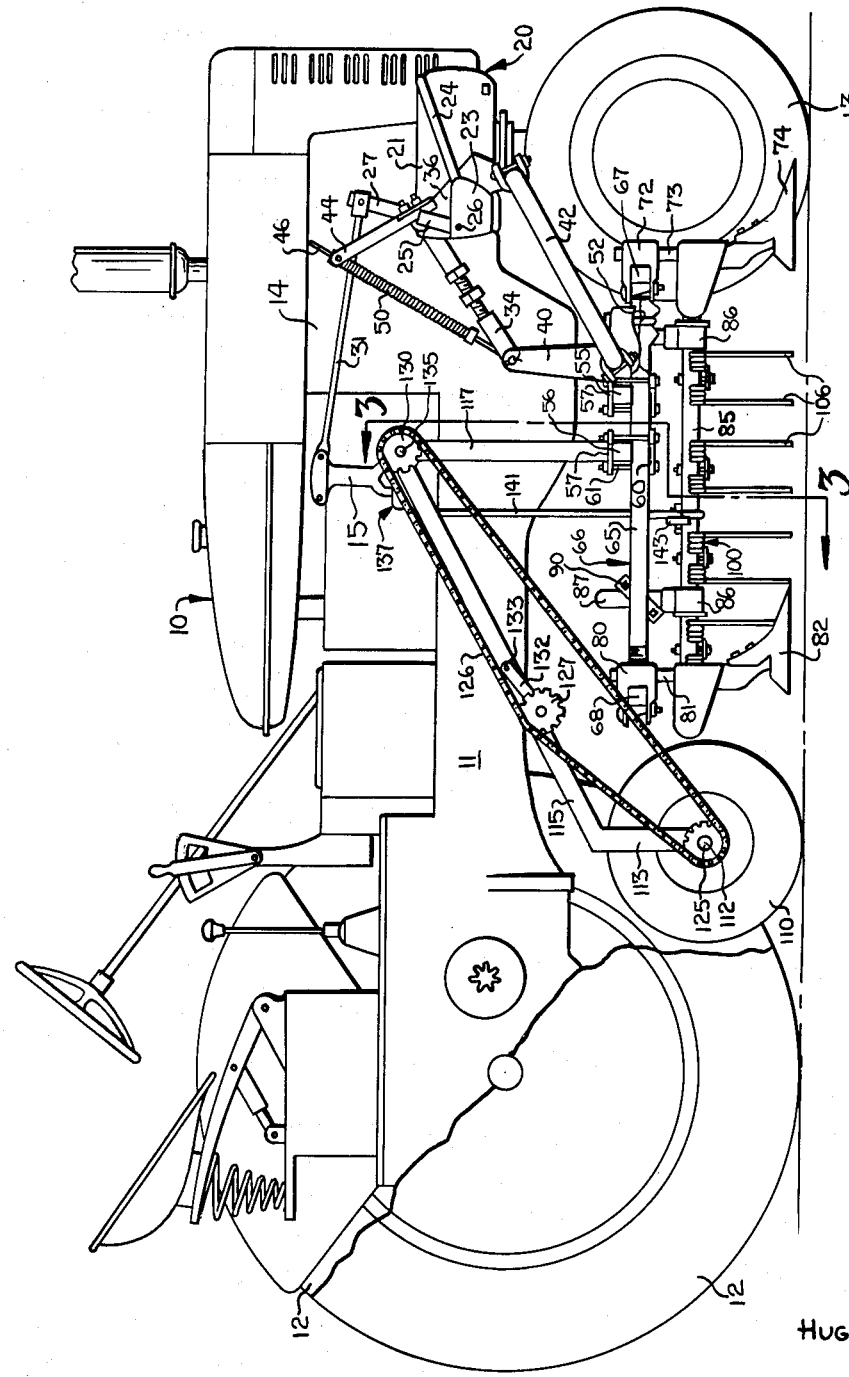
Figure 1 is a side elevation of the improved attachment showing the same associated with a tractor.

Referring more specifically to the drawings, the numeral 10 broadly designates a tractor having a frame 11, rear wheels 12, closely spaced front wheels 13 and a motor housing 14 fixed on the forward portion of the frame 11. The tractor 10 is also provided with conventional right-hand and left-hand hydraulic control arms 15 and 15' (Figures 1, 2 and 4) which are mounted on opposite sides of the tractor frame 11 in a conventional manner. These hydraulic control arms 15 and 15' are adapted to move forwardly and rearwardly in a conventional manner under hydraulic pressure for raising and lowering the improved attachments on opposite sides of the tractor.

Opposite sides of the front end of the tractor are provided with conventional universal supporting, raising and lowering devices broadly designated at 20 and 20'. It is with such supporting devices that the improved hoeing or weeding and cultivating attachment is adapted to be associated, although it is to be understood that the improved attachment may be carried by other types of mounting means and the invention is not limited to the particular tractor or mounting frame shown.

Since the universal supporting device and the attachment on the left-hand side of the tractor are identical to the supporting device and attachment on the right-hand side of the tractor, with the exception of some parts being opposite hand, only the universal supporting device 20 and associated parts on the right-hand side of the tractor 10 will be described in detail and like reference characters will apply to like parts on the left-hand side of the tractor with the prime notation added.

As heretofore stated, the universal supporting device 20 is conventional and comprises a plate frame member 21 fixed to the tractor frame 11, a laterally extending frame beam 22 suitably secured to, or integral with, the plate 21, an end plate 23 fixed on the outer end of the frame beam 22 and a bracing bar 24 which extends forwardly and inwardly from the plate 23 to the plate frame member 21.

As best shown in Figure 4, the downturned outer end of a bail lift 25 is pivotally connected, as at 26, to the plate 23 and extends in spaced relation above the frame beam 22 and has the inner end thereof fixed to the medial portion of an arm 27. The lower end of arm 27 is pivotally connected to the frame member 21, as at 30.

The arm 27 extends upwardly and has the front end of a hydraulic lift link 31 pivotally connected thereto (Figure 1). The rear end of the hydraulic lift link 31 is pivotally connected to the conventional hydraulic control arm 15. The front end of a pair of upper parallel adjustable links 34, 35 are pivotally connected to respective brackets 36, 37 carried by the lateral frame beam 22.

The rear ends of the links 34, 35 are pivotally connected to the upper ends of respective tool bar clamp arms, members or cranks 40, 41 which extend downwardly and are adapted to carry a tool bar or tool frame.

The lowermost ends of the tool bar clamp members or cranks 40, 41 are suitably grooved in a conventional manner for receiving a tool bar and, in this instance, for receiving the forward ends of frame members of the improved hoeing or weeding and cultivating apparatus to be later described.

The lower portions of the tool bar clamp members or cranks 40, 41 are provided with horizontally extending bores in which the lower ends of respective gang beams or lower parallel links 42, 43 are pivotally mounted. The lower parallel links or gang beams 42, 43 extend upwardly and forwardly at an angle in Figures 1 and 4 and are pivotally mounted in the front ends of the respective head brackets 36 and 37. The arrangement of the upper and lower parallel links 34, 35, 42 and 43, together with the tool bar clamp members 40, 41 is such that the lower ends of the tool bar clamp members are maintained in a substantially horizontal position as they are raised and lowered.

The tool bar clamp members 40, 41 are raised and lowered by means of the hydraulic control arm 15 and intervening connections to the bail lift 25, which bail lift has the lower ends of a pair of arms 44, 45 fixed thereto. The bifurcated upper ends of the arms 44, 45 have the front upper ends of respective pressure rods or links 46, 47 (Figures 1 and 4) pivotally connected thereto. The pressure rods 46, 47 extend downwardly and rearwardly and are pivotally connected to the upper ends of the respective tool bar clamps 40, 41. The pressure rods 46, 47 are each provided with an adjustment spring 50 positioned thereabout.

It is thus seen that operation of the hydraulic lift control 15 causes pivotal movement of the bail bar 25 relative to the frame beam 22 and this causes the pressure rods 46, 47 to impart upward or downward pressure, as the case may be, to the tool bar clamp members 40, 41.

The universal supporting device thus described and illustrated is conventional and it is with a frame of this type or similar type that the present invention is particularly adapted to be associated.

Suitably secured to the lower ends of the tool bar clamp members 40, 41, as by U-bolts or clamp bolts 52, are the front ends of respective outer and inner longitudinally extending frame members or straddle bars 53, 54 which may be of conventional or other construction and which may be straight throughout their length. The rear ends of straddle bars 53, 54 are shown in Figures 3 and 4 as though extending apart from each other merely because the particular bars used in this instance are of a type usually employed for attaching conventional plows or cultivator blades thereto.

Suitably detachably secured to the upper surfaces of the straddle bars 53, 54, and spanning the distance therebetween, are front and rear transverse frame members or supports 55, 56, the transverse frame member 55 being disposed immediately rearwardly of the bar clamp members 40, 41. In this instance, the transverse frame members or supports 55, 56 are secured to the corresponding straddle bars 53, 54 by means of upper and lower clamp plates 57, 60 fastened together with respective pairs of bolts 61 (Figures 1, 3 and 4).

Suitably secured to the lower surfaces of the medial portions of the transverse supports 55, 56, between the straddle bars 53 and 54, is a longitudinally extending shank portion 65 of an improved universal mounting I-frame or beam broadly designated at 66. The I-frame 66 also includes transverse relatively short front and rear portions 67, 68. The I-frame 66 is adapted to carry the improved oscillatable hoeing or weeding members as well as conventional sweeps, plows or cultivator blades for plowing the earth adjacent opposite sides of a row of plants, such as cotton plants or the like, one of which is shown in Figure 3 indicated at C, thus forming therewith a universally mountable, compact, self-contained and self-driven attachment.

In this instance, the shank portion 65 of the I-frame 66 is secured to the rear transverse support 56, as by welding, and is detachably secured to the front transverse frame member 55 by a clamping device generally designated at 71 and which may be identical to the clamping devices, including members 57, 60 and 61 employed for detachably securing the transverse supports 55, 56 to the straddle bars 53, 54. Therefore, a further description of the clamping device 71 is deemed unnecessary.

The front transverse portion 67 of the I-frame 66 has a pair of closely transversely spaced clamp adapters or blocks 72 suitably attached thereto in each of which the upstanding helve or shank 73 of a cultivating plow, sweep, shovel or blade 74, of conventional or other construction, is suitably secured. The rear portion 68 of the I-frame 66 also has a pair of closely transversely spaced clamp blocks 80 suitably attached thereto in which the upstanding shanks or helves 81 of cultivator plows, sweeps, shovels or blades 82 are suitably secured.

It will be observed in Figures 1, 2, 3 and 4 that the cultivator plows 74, 82 are disposed in substantially longitudinal alinement with each other and their inner edges are preferably cut-away as best shown in Figure 1 so that each pair of plows 74, 82 may be spaced relatively close together for engaging the ground G on each side of a row of plants C as shown in Figure 3.

The cultivator plows 74, 82 may be of conventional construction and the invention, as thus far described, resides in the novel framework, including the I-frame 66 and the transverse supports 55, 56, for supporting the plows 74, 82 and the oscillatable hoeing or weeding members to be presently described.

Spaced beneath and extending in parallel relation to the shank portion 65 of the I-frame 66 is an oscillatable shaft or rocker shaft 85 which is journaled in the enlarged lower portions of a pair of bearing members 86. Each of the bearing members 86 has a relatively thin uprising portion 87 which is suitably secured to one side of the shank portion 65 of the I-frame 66, as by means of a U-bolt 90. Each of the U-bolts 90 straddles the upright portion 87 of the corresponding bearing 86 and also straddles the shank portion 65 of the I-frame 66 and is attached to a bridging plate 91 to thereby clampingly and adjustably secure the upright portions 87 of the bearings 86 to the shank 65 of the I-frame 66.

A plurality of oscillatable spring fingers or inherently resilient tine assemblies 100 are suitably secured to the rocker shaft 85. These oscillatable spring fingers 100 may also be termed as weeders or hoeing members. As best shown in Figures 5 and 6, each of said tine assemblies preferably comprises a horizontally extending transverse portion 101 suitably secured to the lower portion of the rocker shaft 85, as by means of a washer 102, to which the horizontal portion 101 is preferably secured, as by welding, and a bolt 103 which penetrates the shaft 85 and is secured thereon by a nut 104.

The horizontal portion 101 is bent at each end thereof to form spring loops 105 and laterally spaced downwardly extending tine portions or spring fingers 106. It will be observed that, from this type of construction, the downwardly extending spring fingers or tines 106 are inherently resilient and will oscillate upon oscillation of the rocker shaft 85. There are preferably two sets of spring fingers 100 associated with each of the washers 102 as will be clearly observed in Figures 1 and 5. Any desired number of these spring finger assemblies may be attached to the rocker shaft 85 in a manner such as described to provide a plurality of downwardly extending longitudinally alined pairs of tines 106.

It will be observed in Figure 3 that the tines 106 extend downwardly from the portion 101 and slightly diverge from each other so as to normally straddle the row of small plants C. By means of the upright portions 87 on the bearings 86 and the adjustment U-bolts 90, as well as the hydraulic connections for the universal mounting frame, the position of the lower ends of the tines 106 relative to the ground G may be accurately adjusted.

It is highly desirable that the lower ends of the tines 106 be so positioned as to penetrate approximately one-half inch of the dirt or earth forming the row in which the small plants C are planted. This penetration is sufficient to break up the crust of earth, to kill grass or weeds growing between the cotton plants, to permit the earth to absorb moisture and to form a mulch around the young plants for retaining moisture. However, this penetration will then not be great enough to damage the roots of the plants or the plants themselves.

Now, an extremely important feature of the present invention lies in novel means for oscillating the rocker shaft 85 and the tine assemblies 100 at a speed corresponding to the speed at which the improved attachment is drawn over the ground by the tractor 10 and at a speed independently of the speed of the motor of the tractor. To this end, a ground wheel 110 is disposed rearwardly of and in substantial alinement with the outermost of the rear cultivator plows or blades 82, and to one side of the longitudinal axis of the rocker shaft 85, so the ground wheel 110 rides upon the ground to one side of the row of plants C and, also, substantially in the furrow formed by the two outermost plows 74 and 82.

The ground wheel 110, which preferably has a pneumatic tire thereon, is fixed on a transverse shaft 112 journaled in the lower ends of a pair of upright frame members 113, 114 which straddle the ground wheel 110. The frame members are parts of an auxiliary framework broadly designated at 111. The auxiliary framework 111 also includes forwardly and upwardly inclined frame members 115, 116, to the lower ends of which the upper ends of the frame members 113, 114 are connected and whose front ends are suitably secured to the upper ends of respective upright portions 117, 118 of a substantially U-shaped standard 121.

The lower horizontal portion of the standard 121 is suitably secured to the upper surface of the transverse support 56. Of course, the lower portion of the standard 121 may be fixed directly to the shank portion 65 of the I-frame 66, if desired. Suitable bridging members or separator members 122, 123 are suitably secured at opposite ends thereof to the lower rear and medial portions of the inclined frame members 115, 116. One end of the axle or shaft 112 has a cog wheel or sprocket wheel 125 fixed thereon which is engaged by an endless belt or sprocket chain 126. The sprocket chain 126 also engages a tension cog wheel or sprocket wheel 127 and a front upper cog wheel or sprocket wheel 130.

The idler cog wheel 127 is rotatably supported on a tension arm 132 adjustably secured, as at 133, to the inclined frame member 115. Of course, the idler wheel 127 maintains the endless sprocket chain 126 under proper tension. The front or upper sprocket wheel 130 is fixed on one end of a crank shaft 135 which is journaled in the upper end of the inclined frame member 115 and the upper end of the upright portion 117 of the standard 121, and to the inner end of which one arm of a built-up crank throw, generally designated at 137 is suitably secured.

The other arm of the crank throw or eccentric 137 is fixed to the inner end of a crankshaft 140 alined with crankshaft 135 and which is journaled in the upper end of the upright portion 118 of the standard 121 and the front upper end of the inclined frame member 116. The upper end of a connecting rod or link 141 is pivotally connected to the crank throw 137 by means of a pivot block or clevis 142. The lower end of the connecting rod 141 is bent rearwardly and pivotally connected to the outer portion of a crank arm 143.

The crank arm 143 is provided with a plurality of bores or holes 144 in any one of which the rearwardly bent lower end of the connecting rod 141 may be positioned in accordance with the desired stroke of the tines 106. The crank arm 143 is shown as being made from strap iron or the like and it extends inwardly and is suitably secured to the rocker shaft 85, as by a U-bolt 146, as best shown in Figure 3.

It is thus seen that, as the improved attachment is propelled over the ground by the tractor 10, the ground wheel 110 is rotated, by contact with the ground G, to thereby impart oscillation to the rocker shaft 85 and the tines 106. It is apparent that rotation of the ground wheel 110 causes the tines to oscillate back and forth across the row of plants C at a speed corresponding to the speed at which the implement or attachment is moved along the row of plants C, since oscillation is imparted to the rocker shaft 85 by means of the sprocket wheel 125 fixed on shaft 112, the sprocket chain 126 and sprocket wheel 130 which, in turn, imparts rotation to the crank throw 137.

Of course, as the crank throw 137 rotates, it imparts vertical reciprocatory movement to the connecting rod 141 and the outer portion of the crank arm 143 which, in turn, imparts oscillation to the rocker shaft 85. As the tractor moves forwardly, the tines 106 will move back and forth across the row and also forwardly and will serve to break up the crust of earth around the young plants in a spiral manner without, necessarily, throwing the earth in the hill, formed around the plants by the plows 74 and 82, away from between adjacent plants.

Due to their inherent resiliency, the tines 106 will cause relatively little or no damage to the plants or, as a matter of fact, since the tines are only caused to oscillate at a speed corresponding to the speed at which the implement or attachment is moved along the row of plants, they can be made to move to either side of the plants as they move thereby and will, therefore, in most instances, entirely clear the plants although they break up the crust of earth immediately around or adjacent the young plants.

As heretofore stated, the position of the tines should be adjusted relative to the ground wheel 110 and the cultivator plows or blades 74 and 82 so they only slightly penetrate the earth adjacent the small plants.

The implements or attachments at both sides of the tractor are identical, except for some of the parts being opposite hand and, as a result, the tines at opposite sides of the tractor 10 are driven independently of each other so that, in the event of the rows being curved, the particular set of tines on the inside of the turn being made by the tractor 10 may oscillate at a slower rate than the tines on the outside of the turn.

It is thus seen that I have provided an improved hoeing or weeding and cultivating attachment which is universally adapted to be carried by a conventional universal supporting device of a tractor, which is self-contained and self-driven and which comprises a longitudinally extending rocker shaft from which a plurality of inherently resilient tines depend and wherein a novel means is provided for oscillating the tines back and forth across the row of plants independently of the speed at which the motor of the tractor is driven, but in accordance with the rate at which the implement or attachment moves over the ground. Also, the tines are so arranged as to scrape the surface of the ground or to slightly penetrate the surface of the ground in which young plants, such as cotton plants, are growing to thereby uproot and destroy grass, weeds and the like and to thereby form a mulch and to permit better penetration of moisture to the roots of the young plants without injury to the plants.

In the drawings and specification there has been set forth a preferred embodiment of the invention and, although specific terms are employed, they are used in a generic and descriptive sense only and not for purposes of limitation, the scope of the invention being defined in the claims.

I claim:

1. A hoeing attachment for a tractor, said tractor having a universal supporting device provided with a pair of laterally spaced tool bar clamps; said hoeing attachment comprising a pair of laterally spaced horizontal straddle bars fixed to said clamps, at least one transverse support spanning said straddle bars, an I-frame having an elongated shank secured to said transverse support, at least two spaced bearing members depending from and mounted for vertical adjustment on said shank, a rocker shaft journaled in said bearing members, at least one row of spaced inherently resilient tines depending from said rocker shaft, a framework fixed on the transverse support and having a first portion positioned above the rocker shaft and having a second portion thereon disposed to one side of said rocker shaft, a ground wheel journaled in the second portion of said framework, a crank having a shaft thereon journaled in the first portion of said framework, driving connections between said shaft and said ground wheel, an arm fixed to, and extending laterally from, said rocker shaft, and a link connecting said arm with said crank.

2. A hoeing attachment for a tractor, said tractor having a universal supporting device provided with a pair of laterally spaced tool bar clamps; said hoeing attachment comprising a pair of laterally spaced horizontal straddle bars fixed to said clamps, at least one transverse support spanning said straddle bars, an I-frame having an elongated shank provided with relatively short front and rear transverse bar portions, means securing the shank to said transverse support, a cultivator plow depending from each end of each transverse bar portion, at least two spaced bearing members depending from, and mounted for vertical adjustment on, said shank, a rocker shaft journaled in said bearing members, two spaced rows of inherently resilient tines depending from said rocker shaft, a framework fixed on the medial portion of said transverse support and extending upwardly therefrom and then rearwardly and downwardly, a ground wheel journaled in the rear end of said framework, a crank having a shaft thereon journaled in the front upper portion of said framework, a sprocket wheel fixed on said shaft, a second sprocket wheel on said ground wheel, an endless sprocket chain connecting said sprocket wheels, an arm fixed to, and connecting said sprocket wheels, an arm fixed to, and extending laterally from, said rocker shaft, and a link connecting said arm with said crank.

3. In a hoeing attachment for a tractor wherein said tractor has a universal mounting frame including tool bar clamp members thereon and said attachment having a horizontally disposed rocker shaft provided with a plurality of inherently resilient tines depending therefrom; improved means for supporting and driving said rocker shaft comprising a substantially I-shaped frame, means for detachably mounting said I-frame on the universal mounting frame, at least two bearing members in which spaced portions of said rocker shaft are journaled, each of said bearing members having an upright portion thereon, means detachably securing said upright portions to the I-frame, a substantially U-shaped frame member carried by the medial portion of said I-frame and having upright portions thereon, a pair of downwardly and rearwardly inclined frame members secured to the upper ends of said upright portions of the U-frame, a downwardly projecting frame member secured to the rear end of each of said downwardly and rearwardly inclined frame members, a ground wheel journaled in said downwardly extending frame members rearwardly of the I-frame, crank shafts journaled in the upper ends of the upright portions of the U-shaped frame member, a crank throw movable between the proximal portions of the upright portions of the U-shaped frame member and the rearwardly and downwardly inclined frame members, means attaching said crank throw to the proximal ends of said crank shafts, a connecting rod pivotally connected at one end thereof to said crank throw, a crank arm fixed to and extending outwardly from said rocker shaft, the lower end of said connecting rod being connected to said last-named crank arm, a sprocket wheel fixed on one of said crank shafts, a sprocket wheel driven by said ground wheel, and a sprocket chain mounted on said sprocket wheels to impart oscillation to said rocker shaft and the tines carried thereby at a speed corresponding to the rate at which the attachment is moved over the ground and being imparted thereto through contact of the ground wheel with the ground.

4. A hoeing attachment for a tractor, said tractor having a vertically reciprocable frame thereon provided with a pair of laterally spaced tool bar clamps; said hoeing attachment comprising an I-frame having an elongated shank provided with relatively short front and rear transverse bar portions, means to secure the I-frame to at least one of said tool bar clamps, a cultivator plow depending from each end of each transverse bar portion, at least two spaced bearing members depending from and mounted for vertical adjustment on said shank, a rocker shaft disposed beneath and in substantially parallel relation to said shank and being journaled in said bearing members, two spaced rows of inherently resilient tines depending from said rocker shaft, a framework fixed on the medial portion of said transverse support and extending upwardly therefrom and then rearwardly and downwardly, a ground wheel journaled in the rear end of said framework, a crank having a shaft thereon journaled in the front upper portion of said framework, driving connections between said shaft and said ground wheel, an arm fixed to and extending laterally from said rocker shaft, and a link connecting said arm with said crank.

References Cited in the file of this patent

UNITED STATES PATENTS

| Number | Name | Date |
|---|---|---|
| 867,397 | Murray | Oct. 1, 1907 |
| 1,270,453 | Smith | June 25, 1918 |
| 2,592,097 | Younger | Apr. 8, 1952 |
| 2,637,154 | Shaver | May 5, 1953 |